March 5, 1940. J. G. HILL 2,192,227
TIRE ANTISKID DEVICE
Filed June 16, 1938
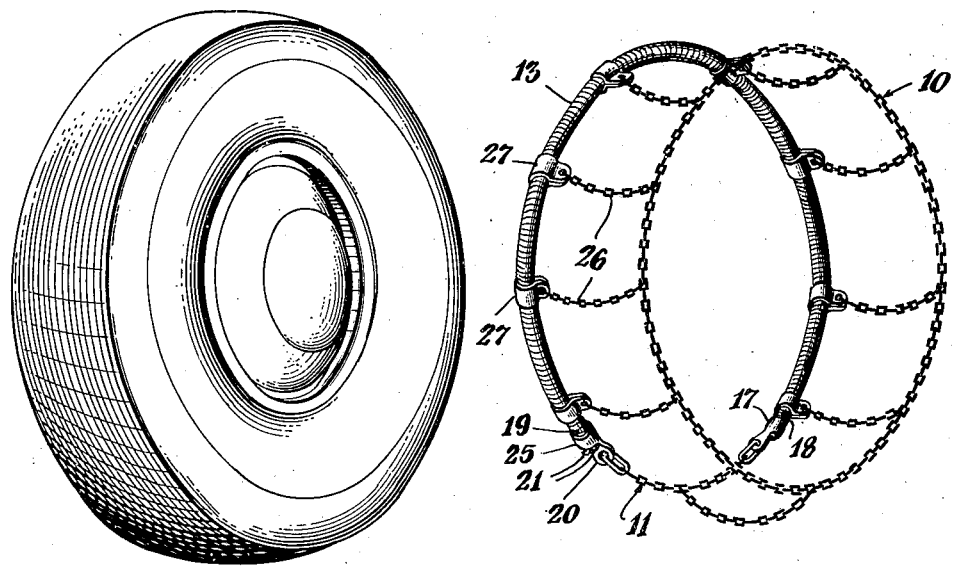
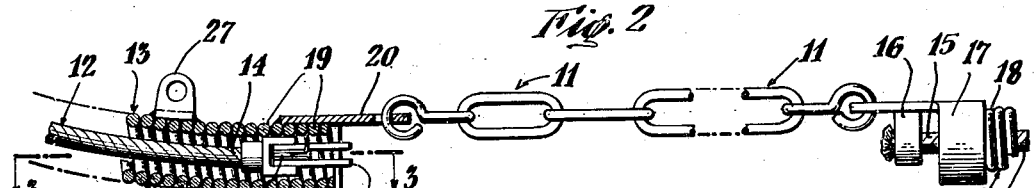
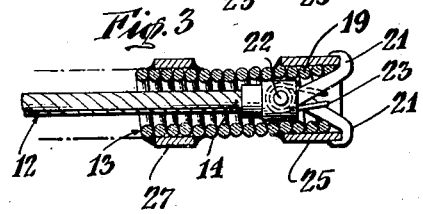
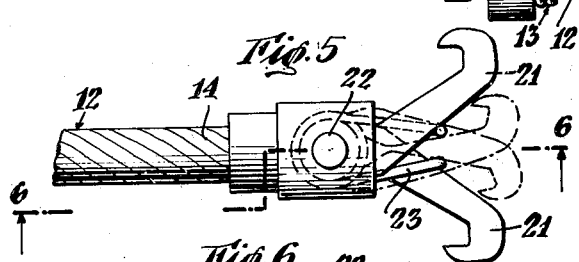
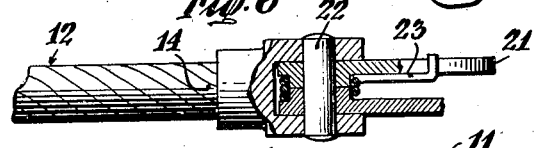
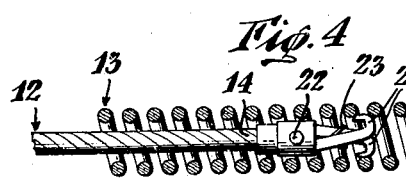
INVENTOR
John G. Hill
BY
ATTORNEYS Patented Mar. 5, 1940

2,192,227

UNITED STATES PATENT OFFICE 2,192,227

TIRE ANTISKID DEVICE

John G. Hill, Franklin Township, Luzerne County, Pa.

Application June 16, 1938, Serial No. 213,962

4 Claims. (Cl. 152—242)

This invention relates to antiskid devices for use on automobile tires. The object of the invention is to provide an antiskid device which may be readily attached to a tire.

The device consists of ground-gripping elements extending between two rings which engage the opposite walls of the tire. The ring for the outside wall of the tire is inextensible and is smaller than the rim of the tire. The design of the inside ring is such that it may be extended to allow its passage over the rim of the tire, although it is smaller than the rim of the tire and inextensible when in use. The construction is such that the continuity of the ring is not broken when it is being passed over the tire. Provision is made so that the inside ring will return to its normal size, in which condition it is locked into an inextensible ring.

It is an object of the invention to so construct an antiskid device that it will lend itself to application to a tire without the annoyance and loss of time which commonly attend the application of an antiskid device.

Other and more detailed objects will be pointed out hereinafter in the accompanying specification and claims, and shown in the drawing which by way of illustration show the principle of my invention and the preferred embodiment.

In the drawing, Fig. 1 shows an exploded view of a tire and antiskid device.

Fig. 2 is an enlarged detail of a section of the inner ring, including the ends of a flexible cable and a section of chain by which the ends are connected.

Fig. 3 is a section through line 3—3 of Fig. 2.

Fig. 4 is a section through the spring showing the relation of the cable to the spring when the cable is disconnected and the ring is expanded.

Fig. 5 is an enlarged view of the hook end of the cable.

Fig. 6 is a section on line 6—6 of Fig. 5.

A common variety of antiskid device consists of a pair of closed rings and interconnecting ground-gripping elements in the form of chains or strips of rubber or like material. The closed rings are usually made from chain links. Because of their flexibility and limpness, their application to a tire frequently involves a great deal of work. An individual contending with a tire chain is very likely to have his placidity disturbed, as well as his clothing soiled and disarranged. My invention renders it unnecessary to handle the free ends of the ring members as is ordinarily required when applying the types of antiskid chains which are commonly used.

In Fig. 1 I have shown a closed ring 10 made up of ordinary links of the type customarily used in antiskid chains. This ring fits upon the outside of the tire. It may be a permanently closed ring or it may have a clasp of the kind commonly used so that its circumference may be varied to suit tires of different sizes. In either event the ring is closed when the chain of the present invention is applied.

The ring which fits upon the inside of the tire 10 consists of a section of chain 11 and a flexible cable 12 which has its ends connected with the section of chain when the device is mounted on the tire and is ready for use. Also constituting a part of the inner ring is a coiled spring 13 within which the flexible cable 12 is located. This cable is preferably a steel wire cable of suitable tensile strength.

In the present embodiment of the invention each end 14, 15, of the flexible cable is connected to the section of chain 11 by means of the same devices which serve to anchor the ends of the coil spring to the section of chain. The end 15 of the cable is permanently fastened to a bracket 16 carried by a link member 17. One end 18 of the coil spring is also connected to this link member as by welding. The other end 19 of the coil spring is connected to link member 20 in the same manner.

For the purpose of attaching the end 14 of the flexible cable to the link member 20, there is provided a pair of hooks 21. These hooks are attached to the end of the cable and are mounted upon a pin 22 about which they may pivot. A spring 23 biases the hooks away from each other. When spring 13 is contracted the hooks project from its end and hook over the rim of the collar 25 in the manner illustrated in Figs. 2 and 3. This collar is a part of the link member 20 to which the chain section 11 is attached.

When the antiskid device is in place upon the tire, the perimeter of the inside ring is that of the combined lengths of the cable and section of chain 11, as illustrated in Fig. 1. When the antiskid device is being mounted upon a tire, the inside ring is extended through the resiliency of the coiled spring 13. The expansion of the coiled spring is permitted only when the pair of hooks 21 is disengaged from the collar 25. When this has been done and spring 13 is expanded, the hooks are drawn within the sleeve formed by the coil spring in the manner shown in Fig. 4. As the length of the inside ring is increased, the loosened end of the cable is drawn further within the sleeve provided by the coiled spring.

After the expanded ring has passed over the rim of the tire, the resiliency of the spring causes contraction of the coils, with the result that the end of the cable returns to its normal relationship with the end of the spring. This is shown in Figs. 2 and 3. In this position, the coil spring is contracted to its normal condition and the hooks 21 extend over the collar 25. This locks the collar and the end of the cable together and the inextensible condition of the inside ring is automatically re-assumed.

In applying the antiskid device to a tire, the operator mounts the inner ring over a portion of the rim of the tire and then releases the connection between the hooks 21 and collar 25. Upon squeezing the hooks together, the inside ring may be expanded and forced over the tire. This may be done even when the car is standing on the ground, in which case it is necessary to move the car enough to permit the full extent of the inside ring to pass over the rim of the tire. When the ring has been passed over the rim, the expanded spring contracts until the circumference of the ring re-assumes its normal dimension. In this position the two hooks automatically spread and lock the ring into an inextensible element.

The ground engaging elements 26 which extend between the inside and outside rings may consist of the usual metallic links and chains or may take other forms such as that of rubber or fibrous treads. When chain links are used they may be directly connected to links in the outside chain. Those ground engaging elements which are opposite a chain section in the inside ring may be directly fastened to the links of the chain section but other provision must be made for the inside ends of the ground engaging elements opposite the flexible cable.

I have successfully used for that purpose metallic clips 27 wrapped about the coiled spring and perforated to make connection with the cross chains. These clips are preferably tacked to the spring by welding.

The construction shown in the drawing and described herein is admirably suited to carry out the objects of the present invention, although I desire it to be understood that I contemplate the use of extensible means other than a coiled spring for enabling the extension of the length of the ring sufficiently to pass over the rim of a tire, such, for example, as another form of spring or elastic tubing. My arrangement contemplates keeping the inner ring or endless member intact and the use of; locking means for locking the ring into an inextensible member while in use. Such locking means will either automatically lock by themselves or be returned to a position where they are held in sufficiently close relationship to facilitate their engagement by an operator. The locking means which I have shown in the drawing, includes two hooks 21, which, depending upon the relationship of the other elements of the device, are capable of accomplishing either one or both of these objectives.

One advantage of the present invention is that it is not necessary to provide clasps for permitting the opening of the inner and outer rings, although clasps may be used to enable adjustment for different tire sizes. After the antiskid device has been fitted to a tire it will then no longer be necessary to open the rings when the device is being applied or removed.

What is claimed is:

1. In a tire antiskid device, the combination comprising a chain forming a ring for engaging with the outside of a tire, a second ring including a section of a chain and a cable with means for securing the chain and cable together, said means including disengageable elements at one end of the cable, a coiled spring enclosing said cable, said coiled spring being attached to the ends of said section of chain and capable of expansion for enlarging the ring when said disengageable elements are disengaged from each other and the loosened end of the cable is drawn within the coiled spring, and cross chains extending between the two rings.

2. In a tire antiskid device, the combination comprising a pair of inextensible ring members, each of which is too small to pass over the rim of a tire, ground-gripping elements extending between and connecting said ring members, a cable forming part of one of said ring members, means for enabling disconnection of said cable from the remaining portion of said ring member, and an extensible sleeve member attached to said ring member, said extensible sleeve member being normally out of use when the antiskid device is in place upon a tire and adapted to guide the free end of the cable when the same is disconnected from the remaining portion of the ring and the extensible sleeve member is lengthened.

3. In a tire antiskid device, the combination comprising a ring for engaging the outside of a tire, a second ring for engaging the far side of a tire, and cross chains connecting the two rings together, said second ring comprising substantially inextensible elements having a circumference less than that of the rim of the tire when in use, means for enabling disconnection of said inextensible elements for passing the second ring over the rim of the tire, and a coiled spring enclosing a length of said inextensible elements, said spring being secured at both ends to another length of said inextensible elements and together therewith having a contracted circumference corresponding to that of the inextensible elements of the second ring but being extensible when the inextensible elements of the second ring are disconnected from each other.

4. In a tire antiskid device, the combination comprising a ring for engaging with one side of a tire, said ring comprising a series of chain links, another ring for engaging with the far side of a tire, said last named ring being inextensible while in use and including a cable, means for enabling disconnection of the cable from the remainder of the ring for making a break in the ring, a helical spring containing said cable and having its ends attached to the ends of the arc of said ring including the cable, and ground-engaging elements connecting the two rings together.

JOHN G. HILL.